United States Patent [19]

Tsai

[11] Patent Number: 5,464,244
[45] Date of Patent: Nov. 7, 1995

[54] RETRACTABLE HANDLE FOR HAND TRUCKS OR THE LIKE

[76] Inventor: James Tsai, 103, Ta Ming 1 Rd., Tung Pao Tsun, Tan Tzu Hsiang, Taichung Hsien, Taiwan

[21] Appl. No.: 328,823

[22] Filed: Oct. 25, 1994

[51] Int. Cl.⁶ .................................................. B62B 1/04
[52] U.S. Cl. .................. 280/655; 280/47.29; 280/47.24
[58] Field of Search .................................. 280/652, 651, 280/655, 655.1, 654, 47.24, 47.27, 47.18, 47.29

[56] References Cited

U.S. PATENT DOCUMENTS

| | | |
|---|---|---|
| 4,896,897 | 1/1990 | Wilhelm . |
| 5,178,404 | 1/1993 | Chen ........................................ 280/655.1 |
| 5,181,590 | 1/1993 | Carpenter et al. . |
| 5,257,800 | 11/1993 | Yang ........................................ 280/655 |
| 5,291,976 | 3/1994 | Ku . |
| 5,294,145 | 3/1994 | Cheng . |
| 5,295,565 | 3/1994 | Latshaw . |
| 5,308,103 | 5/1994 | Chin-Shang .................. 280/655.1 |
| 5,323,886 | 6/1994 | Chen . |
| 5,374,073 | 12/1994 | Hung-Hsin ............................. 280/655 |
| 5,397,151 | 3/1995 | Aserg ..................................... 280/655 |

*Primary Examiner*—Richard M. Camby
*Attorney, Agent, or Firm*—Bacon & Thomas

[57] ABSTRACT

A retractable handle including two parallel sleeves, a cross member connected between the sleeves at the top, and two extension rods connected in parallel and moved in and out of the sleeves, the cross member being incorporated with a spring supported pressure plate, the pressure plate having two beveled push blocks at two opposite ends, the extension rods having two spring-supported lock bolts horizontally disposed at the bottom, wherein the lock bolts are forced by the respective springs through respective locating holes on the sleeves into respective bottom notches on the cross member and stopped above the beveled push blocks to lock the retractable handle in the operative position when the extension rods are pulled out of the sleeves; the lock bolts are forced backwards from the bottom notches of the cross member into the locating holes on the sleeves, when the pressure plate is depressed against the cross member, permitting the extension rods to be moved back inside the sleeves and received in the collapsed position.

1 Claim, 5 Drawing Sheets

RETRACTABLE HANDLE FOR HAND TRUCKS OR THE LIKE

BACKGROUND OF THE INVENTION

The present invention relates to a retractable handle for a hand truck or the like which comprises two spring-supported lock bolts for locking the retractable handle in the operative position, and a spring supported pressure plate for releasing the lock bolts from the locking position.

Various luggage and folding collapsible hand trucks are well known and intensively used by travelers for carrying things. These luggage and hand trucks commonly have a retractable handle for moving with the hand and two opposite adjustment knobs for locking the retractable handle in the operative position. This structure of retractable handle is complicated and inconvenient to operate. Because the locking of the retractable handle by the adjustment knobs is achieved by friction force, the friction area between the retractable handle and the adjustment knobs will soon be wear away with use, causing the retractable handle to oscillate.

SUMMARY OF THE INVENTION

The present invention has been accomplished to provide a retractable handle which eliminates the aforesaid drawbacks. It is therefore an object of the present invention to provide a retractable handle which can be firmly locked in the operative position. It is another object of the present invention to provide a retractable handle which is easy to operate. It is till another object of the present invention to provide a retractable handle which is inexpensive to manufacture and easy to assemble.

According to one aspect of the present invention, the retractable handle comprises two parallel sleeves, a cross member connected between the sleeves at the top, and two extension rods connected in parallel and moved in and out of the sleeves and having two spring-supported lock bolts horizontally disposed at the bottom, an auto-return pressure plate horizontally connected to the cross member at the bottom and having two beveled push blocks at two opposite ends, wherein the lock bolts are forced by the respective springs through respective locating holes on the sleeves into respective bottom notches on the cross member and stopped above the beveled push blocks to lock the retractable handle in the operative position when the extension rods are pulled out of the sleeves; the lock bolts are forced backwards from the bottom notches of the cross member into the locating holes on the sleeves, when the pressure plate is depressed against the cross member, permitting the extension rods to be moved back inside the sleeves and received in the collapsed position.

According to another aspect of the present invention, the moving direction of the lock bolts are perpendicular to the moving direction of the extension rods, therefore the extension rods do not oscillate relative to the sleeves when the lock bolts are extended out of the locating holes on the sleeves and inserted into the bottom notches on the cross member.

DETAILED DESCRIPTION OF THE PREFERRED EMBODIMENT

Figure 1:
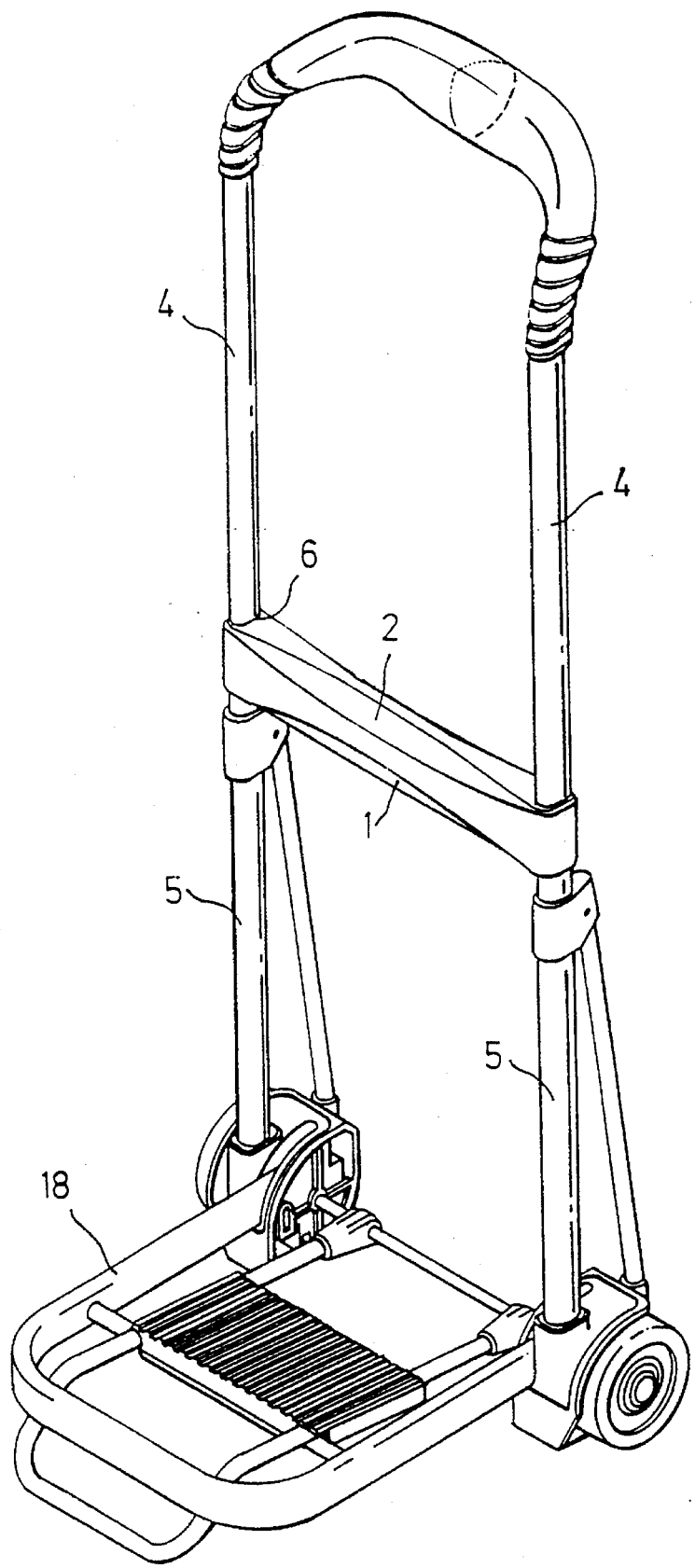
FIG. 1 is an elevational view of a hand truck equipped with a retractable handle according to the present invention.
Figure 2:
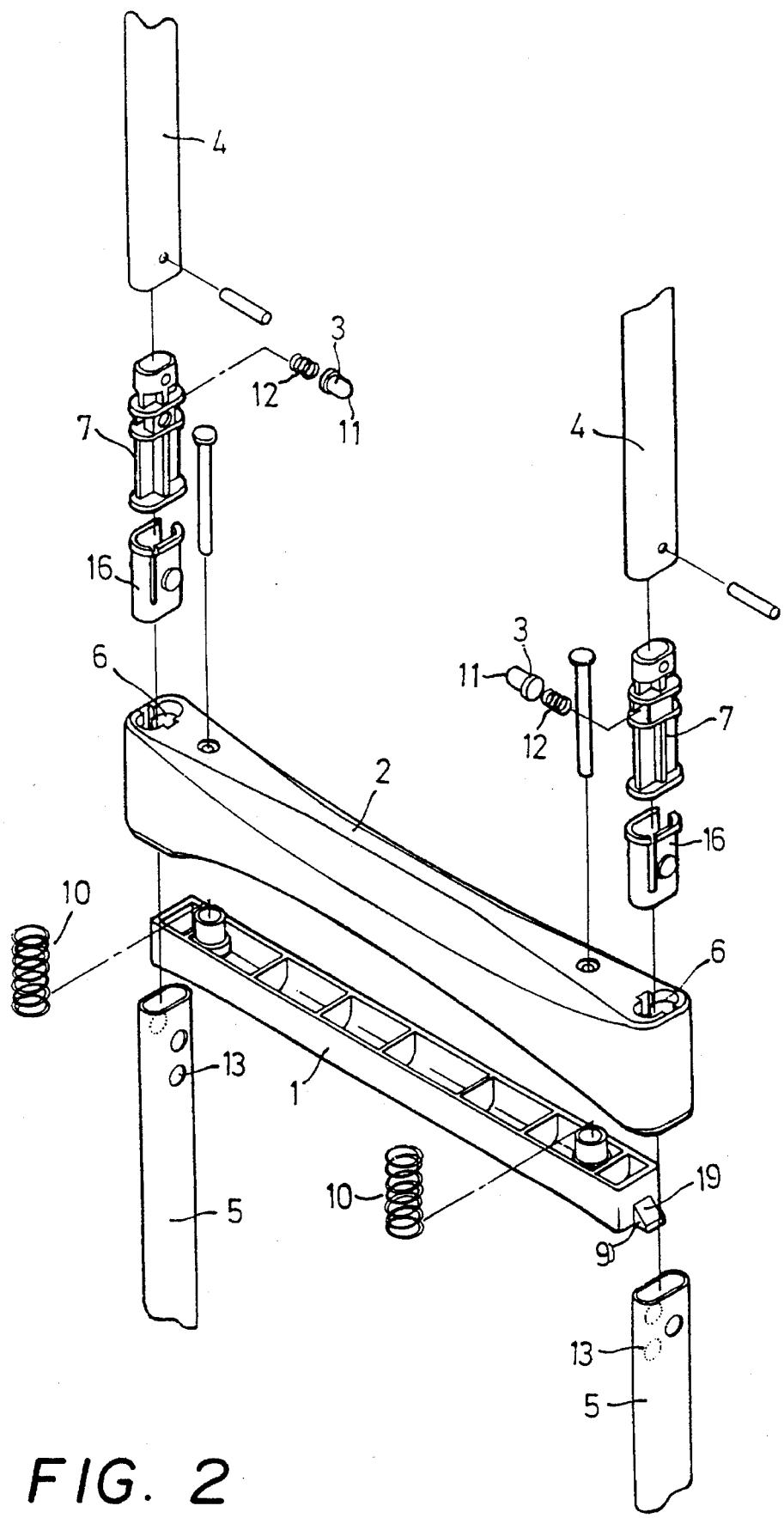
FIG. 2 is an exploded view of the retractable handle shown in FIG. 1.
Figure 3:
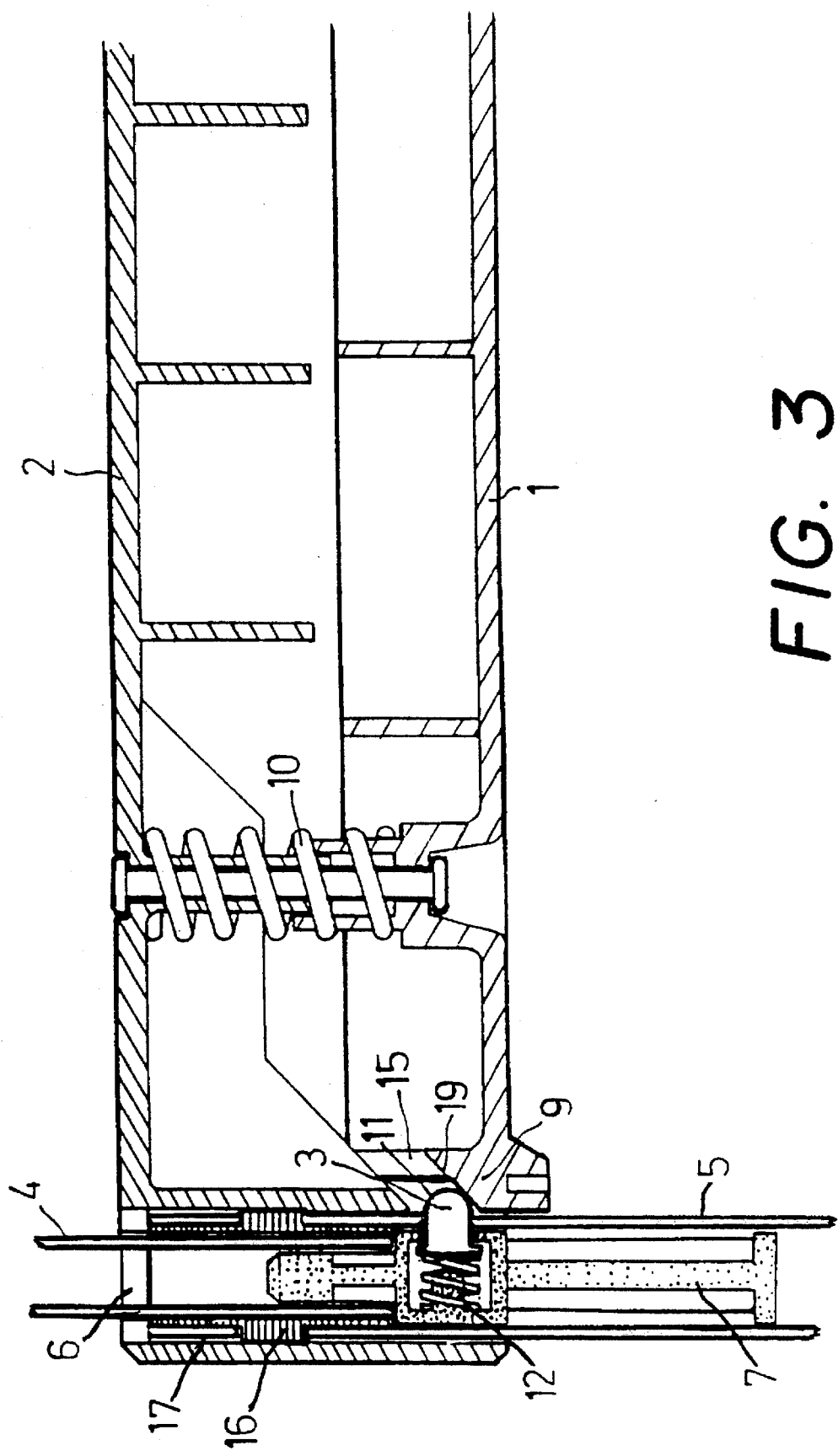
FIG. 3 is a partial view in section of the the retractable handle shown in FIG. 1, showing the lock bolt extended out of the corresponding locating hole on the sleeve into the corresponding bottom notch on the cross member and stopped above the corresponding push block of the cross member.

Referring to FIGS. 1, 2, and 3, a retractable handle in accordance with the present invention is generally comprised of a pressure plate 1, a hollow cross member 2, two lock bolts 3, a pair of sleeves 5 mounted on the base frame 18 of the hand truck, and a pair of extension rods 4 connected in parallel and moved in and out of the sleeves 5. The hollow cross member 2 has two vertical through holes 6 near two opposite ends thereof, which receive the sleeves 5 and the extension rods 4 in the sleeves 5. Two springy plastic jackets 16 are respectively mounted in grooves 17 inside the vertical through holes 6 to hold the sleeves 5. The extension rods 4 are respectively moved in and out of the sleeves 5, each having a bottom end coupled with a respective stop member 7. By means of the stop members 7, the extension rods 4 do not disconnect from the sleeves 5 when they are extended out. The pressure plate 1 is connected to the hollow cross member 2 at the bottom by springs 10, having two push blocks 9 disposed at two opposite ends. Each push block 9 has a bevel top 19 sloping outwards downwards. The lock bolts 3 are respectively horizontally supported on respective springs 12 in the stop members. Locating holes 13 are respectively made on the sleeves 5 near the top. Bottom notches 15 are respectively made on the hollow cross member 2 at locations corresponding to the through holes 13.

Figure 5:
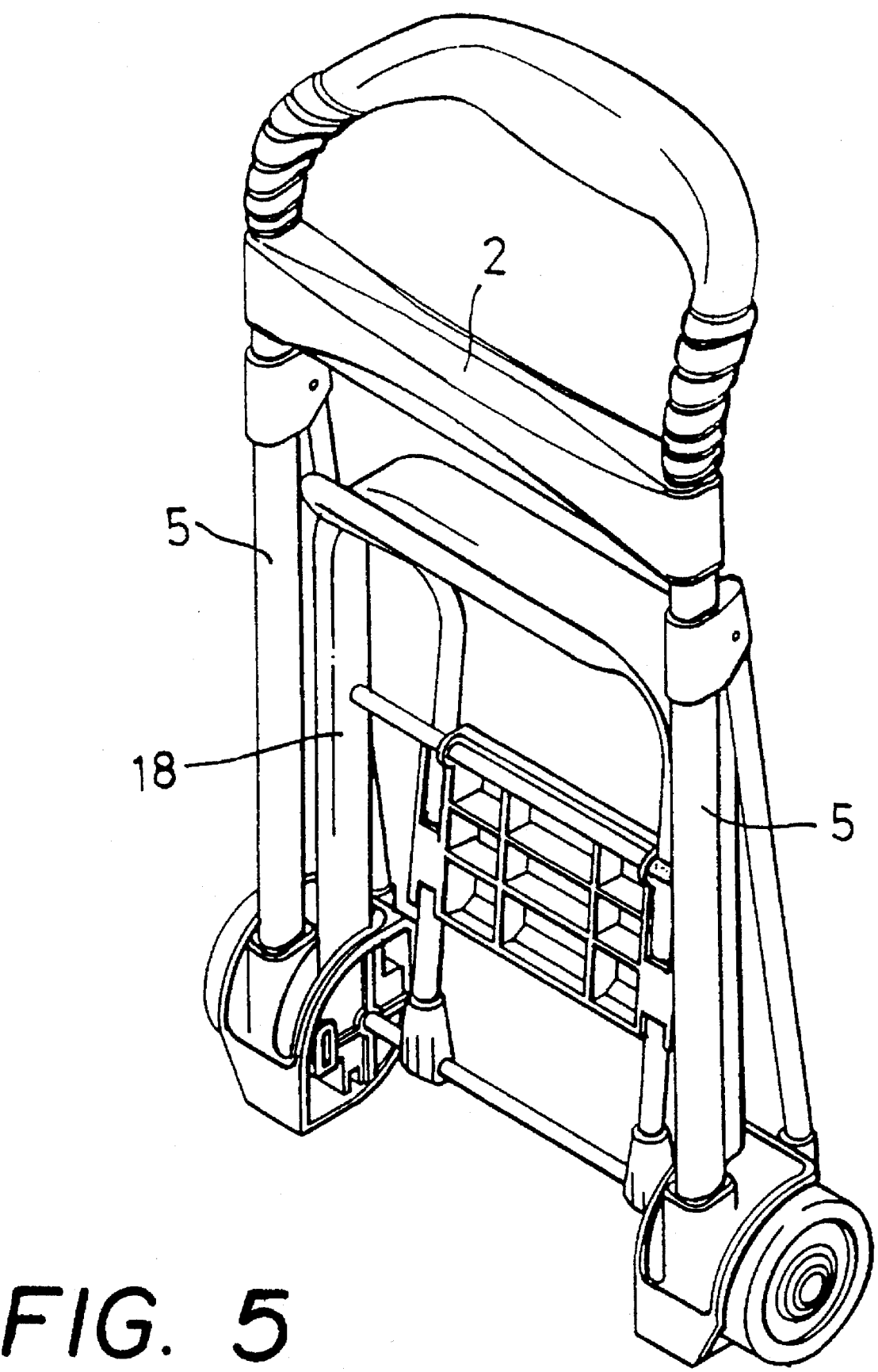
FIG. 5 shows the hand truck of FIG. 1 collapsed.

FIGS. 1 and 5 shows the retractable handle fixed to the base frame 18 of the hand truck. The extended-out length of the retractable handle may be designed according to the capacity or type of the hand truck.

Referring to FIG. 3, when the extension rods 4 are extended out of the sleeves 5, the lock bolts 3 are forced outwards by the springs 12, causing the round ends 11 of the lock bolts 3 extended out of the locating holes 13 into the bottom notches 15 and stopped above the push blocks 19 to lock the retractable handle in the operative (extended-out position).

Figure 4:
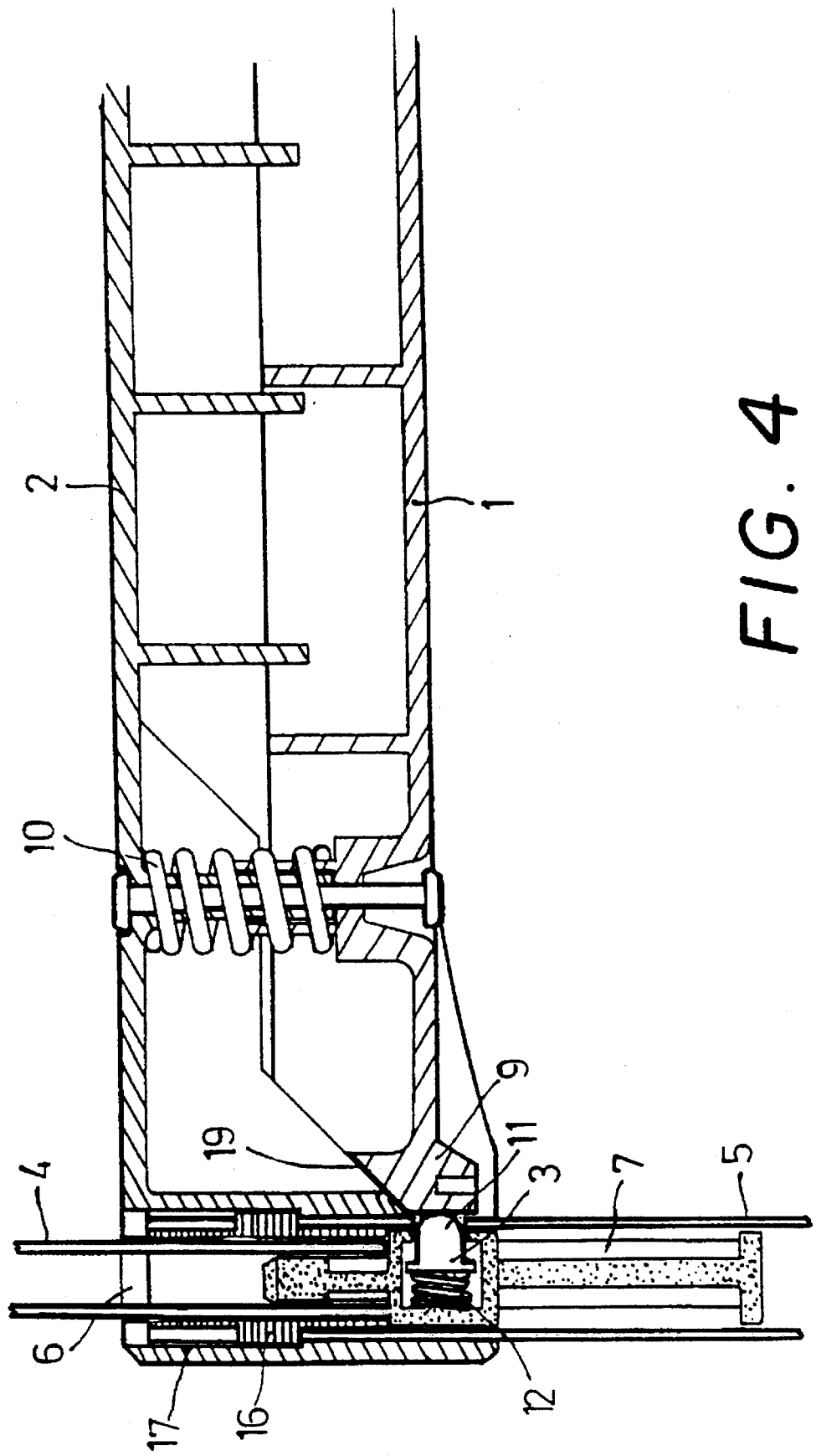
FIG. 4 is similar to FIG. 3 but showing the lock bolt forced backwards from the corresponding bottom notch into the corresponding locating hole.

Referring to FIG. 4, when the pressure plate 1 is depressed to compress the springs 10, the bevel tops 19 of the push blocks 9 are moved upwards to force the lock bolts 3 bilaterally backwards, causing the lock bolts 3 moved backwards from the bottom notches 15 into the locating holes 13, and therefore the lock bolts 3 can be moved away from the locating holes 13 when the extension rods 4 are moved downwards relative to the sleeves 5. When the lock bolts 3 are moved away from the locating holes 13, the extension rods 4 can then be collapsed and received back inside the sleeves 5, and at the same time, the pressure plate 1 is returned to its former position by the springs 10. Because the round ends 11 of the lock bolts 3 are respectively stopped against the inside wall of the sleeves 5, a friction force is produced between the lock bolts 3 and the sleeves 5 when the lock bolts 3 are moved away from the locating holes 13. Therefore, the extension rods 4 do not oscillate relative to the sleeves 5 when they are not positively locked in the operative position.

While only one embodiment of the present invention has been shown and described, it will be understood that various modifications and changes could be made without departing from the spirit and scope of the invention.

What is claimed is:

1. A retractable handle comprising two parallel sleeves having a respective locating hole near a respective top end, a cross member connected between said sleeves, and two extension rods connected in parallel and moved in and out of said sleeves and having a respective bottom end coupled with a respective stop member, the improvement comprising a pressure plate horizontally connected to a bottom side of said cross member by springs and having two beveled push blocks at two opposite ends and two bottom notches bilaterally disposed on a bottom side thereof; two lock bolts respectively horizontally supported on springs in respective holes on the stop members of said extension rods, said lock bolts being forced by the respective springs through respective locating holes on said sleeves into said bottom notches and stopped above said beveled push blocks to lock the retractable handle in an operative position when said extension rods are pulled out of said sleeves, said lock bolts being forced backwards from said bottom notches into the locating holes on said sleeves, when said pressure plate is depressed against said cross member, permitting said extension rods to be moved back inside said sleeves.

* * * * *